(12) United States Patent
Espinasse

(10) Patent No.: US 12,222,055 B2
(45) Date of Patent: Feb. 11, 2025

(54) END FITTING OF A FLEXIBLE PIPE, ASSOCIATED FLEXIBLE PIPE AND RELATED METHODS

(71) Applicant: TECHNIP N-POWER, Courbevoie (FR)

(72) Inventor: Philippe Espinasse, Bihorel (FR)

(73) Assignee: TECHNIP N-POWER (FR)

( * ) Notice: Subject to any disclaimer, the term of this patent is extended or adjusted under 35 U.S.C. 154(b) by 0 days.

(21) Appl. No.: 17/768,568

(22) PCT Filed: Oct. 16, 2020

(86) PCT No.: PCT/EP2020/079173
§ 371 (c)(1),
(2) Date: Apr. 13, 2022

(87) PCT Pub. No.: WO2021/074366
PCT Pub. Date: Apr. 22, 2021

(65) Prior Publication Data
US 2024/0102590 A1    Mar. 28, 2024

(30) Foreign Application Priority Data
Oct. 18, 2019 (EP) .................................... 19306362

(51) Int. Cl.
*F16L 33/01* (2006.01)
*F16L 11/08* (2006.01)
*F16L 33/00* (2006.01)

(52) U.S. Cl.
CPC ............. *F16L 33/01* (2013.01); *F16L 11/082* (2013.01); *F16L 33/003* (2013.01)

(58) Field of Classification Search
CPC ......... F16L 33/01; F16L 33/003; F16L 11/082
See application file for complete search history.

(56) References Cited

U.S. PATENT DOCUMENTS 4,063,757 A * 12/1977 Fuhrmann ............... F16L 33/01
285/251
6,923,477 B2 * 8/2005 Buon .................... F16L 33/003
138/109
(Continued)

FOREIGN PATENT DOCUMENTS

| WO | WO 2004/085905 A1 | 10/2004 |
| WO | WO 2014/001238 A1 | 1/2014 |
| WO | WO 2018/234790 A1 | 12/2018 |

OTHER PUBLICATIONS

International Search Report & Written Opinion mailed Feb. 11, 2021 in corresponding PCT International Application No. PCT/EP2020/079173.
(Continued)

*Primary Examiner* — David Bochna
(74) *Attorney, Agent, or Firm* — OSTROLENK FABER LLP

(57) ABSTRACT

An end fitting (14) of a flexible pipe (14) for conveying a fluid that includes:
an end vault (42) and an outer cover (44) fixed around the end vault (42),
at least a front region (36) of an internal polymeric sheath (18),
at least end sections (40) of at least one tensile armor layer (24, 25) arranged around the internal polymeric sheath (18),
a front sealing assembly (54) arranged around the front region (36) of the internal polymeric sheath (18).
The front sealing assembly (54) includes a cannula (64) supporting at least one part of the front region (36) of the internal polymeric sheath (18) and an annular protrusion (66) arranged on an internal surface (48) of the end vault (42). The front region (36) of the internal polymeric sheath
(Continued)

(18) is circumferentially tightened between the one protrusion (66) and the cannula (64).

18 Claims, 7 Drawing Sheets

(56) References Cited

U.S. PATENT DOCUMENTS

| | | | | |
|---|---|---|---|---|
| 9,574,690 | B2* | 2/2017 | Clevelario | F16L 33/01 |
| 2015/0330890 | A1* | 11/2015 | Clevelario | F16L 33/01 |
| | | | | 285/96 |
| 2020/0158267 | A1* | 5/2020 | Charlesworth | F16L 33/01 |

OTHER PUBLICATIONS

Extended European Search Report mailed Mar. 5, 2020 in corresponding European Patent Application No. 19306362.5 dated May 14, 2020.

\* cited by examiner

END FITTING OF A FLEXIBLE PIPE, ASSOCIATED FLEXIBLE PIPE AND RELATED METHODS

CROSS-REFERENCE TO RELATED APPLICATIONS

The present application is a 35 U.S.C. § 371 national stage application of PCT/EP2020/079173, filed Oct. 16, 2020, which claims priority to European Patent Application No. 19306362.5, filed Oct. 18, 2019, the contents of which are incorporated herein by reference.

TECHNICAL FIELD

The present invention relates to an end fitting of a flexible pipe for conveying a fluid comprising:
- an end vault and an outer cover fixed around the end vault and delimiting a reception chamber,
- at least a front region of an internal polymeric sheath defining a central passage for conveying the fluid, the central passage extending according to a longitudinal direction,
- at least end sections of at least one tensile armor layer arranged around the internal polymeric sheath, the end sections being arranged in the reception chamber,
- a front sealing assembly arranged around the front region of the internal polymeric sheath.

The pipe is in particular a flexible pipe of a type that is not bonded (or "unbonded") intended for conveying a fluid such as a fracking fluid.

BACKGROUND

Hydraulic fracturing also referred to "fracking" is a method consisting in injecting a fracking fluid at high pressure into a reservoir through a wellbore to increase the permeability of the reservoir and release oil and gas.

The fracking fluid consists mainly in water. The fluid may also comprise additional components such as sand, and/or chemical components.

In variant, the fluid conveyed in the flexible pipe is oil and/or gaz.

The flexible pipe is generally formed of a plurality of layers that are concentric and superposed. It is considered "unbonded" within the scope and purpose of the present invention since the tensile armor layers are free to move relative to each other during a flexion of the flexible pipe, i.e. the tensile armor layers are not embedded in a bonding material such as an elastomer.

The pipe is in particular a smooth bore pipe. A pipe is considered as 'smooth bore pipe' when the innermost sheath of the pipe defining the passage for the fluid is made of a polymeric material. This type of flexible pipe does not comprise an inner metal carcass.

The flexible pipe is generally disposed onshore, between a first surface assembly designed for collecting the fluid used onshore and a second surface assembly designed for distributing the fluid. For example, the flexible pipe is disposed between a manifold and a wellhead.

The fluid is for example injected into a wellbore for hydraulic fracturing.

In such a case, the flexible pipe may have a short length comprised between 1 m and 100 m, preferably between 1 m and 20 m.

In a variant, the flexible pipe is disposed across a body of water, between a bottom assembly designed for collecting the fluid used at the bottom of the body of water and a floating surface assembly designed for collecting and distributing the fluid. The surface assembly may be a semi-submersible platform, an FPSO (Floating Production Storage and Offloading unit) or another unit.

Typically, the flexible pipe comprises end fittings for connecting them to an adjacent structure such as a manifold or a wellhead, or to another flexible pipe.

The classical method used to seal the internal sheath of an unbonded flexible pipe is to crimp it between an inner and an outer metallic layers.

The inner metallic layer provides mechanical support to the internal sheath to allow a proper contact and to support the plastic deformation of the internal sheath.

The outer metallic layer is typically a monocone penetrating the internal polymeric sheath. The compression of the internal sheath prevents fluid and gas migration and provides a leak-proof barrier. The monocone is pressed downward and plastically deformed by pushing it forward on a slope machined in the vault of the end fitting. This is done by tightening a flange on the vault which allows creating the forces necessary for the plastic deformation of the monocone and of the internal sheath. A second leak path between the vault and the monocone is sealed by the metal to metal contact that remains energized by the tightening of the crimping flange.

The metal to metal seal requires that the surfaces in contact have a proper finish with no scratch. Therefore, a great care is required during the assembling process of the end fitting. Moreover, due to the fact that the crimping operation of the flange is made from the rear side of the vault, there is some interference with the armors of the flexible pipe that have to be laid back to allow for proper access. This leads to a global lengthening of the end fitting.

An object of the invention is to overcome these drawbacks and to provide an end fitting allowing a good fluid tightness involving less elements in order to reduce the length and the weight of the end fitting.

SUMMARY

To this end, the subject-matter of the invention relates to an end fitting of the aforementioned type, wherein the front sealing assembly comprises a cannula supporting at least one part of the front region of the internal polymeric sheath and at least one annular protrusion arranged on an internal surface of the end vault protruding toward the central passage, the at least one part of the front region of the internal polymeric sheath being circumferentially tightened between the at least one protrusion and the cannula. The end fitting according to the invention may comprise on or more of the following features, taken into consideration in isolation or in accordance with any technically possible combination:
- the at least one protrusion is integral with the end vault;
- the at least one protrusion is an annular ring;
- the at least one part of the front region of the internal polymeric sheath is plastically deformed by the protrusion;
- the front sealing assembly comprises two annular protrusions set apart along the longitudinal direction;
- the end fitting comprises a test port defined in the end vault for controlling the sealing of an inner space delimited by the internal surface of the end vault and an external surface of the internal polymeric sheath, between the annular protrusions;

the front sealing assembly comprises a restraining element for maintaining the cannula fixed to the end vault;

the internal polymeric sheath is a polymeric pressure sheath intended to tightly confine the fluid conveyed by the central passage, the polymeric pressure sheath advantageously having a thickness comprised between 5 mm and 20 mm;

the end fitting further comprises a front region of a pressure sheath, the internal polymeric sheath being a protective polymeric sheath intended to protect the pressure sheath, the pressure sheath being arranged around the protective polymeric sheath;

the end fitting further comprises an intermediate sealing assembly arranged around the front region of the pressure sheath.

The subject-matter of the invention also relates to a flexible pipe comprising:

at least an internal polymeric sheath defining a central passage for conveying the fluid, the central passage extending according to a longitudinal direction, at least one tensile armor layer arranged around the internal polymeric sheath, and an end fitting as described above.

The flexible pipe may comprise one or several of the following features, taken into consideration in isolation or in accordance with any technically possible combination:

the flexible pipe comprises an end fitting as described above and a pressure sheath intended to tightly confine the fluid conveyed by the central passage, the internal polymeric sheath being formed by the pressure sheath;

the flexible pipe comprises an end fitting as described above, a pressure sheath and a protective polymeric sheath intended to protect the pressure sheath and intended to tightly confine the fluid conveyed by the central passage, the pressure sheath being arranged around the protective polymeric sheath, the internal sheath being formed by the protective polymeric sheath.

The invention also relates to a method for mounting an end fitting as described above, the method comprising the following steps:

providing a flexible pipe, providing an end vault comprising at least one annular protrusion arranged on the internal surface of the end vault, the at least one protrusion protruding toward the central passage.

fixing the end fault over at least one part of the front region of the internal sheath, providing a cannula, inserting the cannula for supporting the at least one part of the front region of the internal sheath to circumferentially tightened said at least one part of the front region of the internal sheath between the at least one annular protrusion and the cannula.

Finally, the subject-matter of the invention relates to a method for replacing an internal sheath in a flexible pipe as described above, the method comprising the following steps:

removing the cannula, extracting the internal sheath from the flexible pipe from an end of the end fitting, inserting a new internal sheath by the end of the end fitting, inserting a new cannula into the internal sheath to circumferentially tighten the at least one part of the front region of the internal sheath being between the at least one protrusion of the front sealing assembly and the cannula.

BRIEF DESCRIPTION OF THE DRAWINGS

The invention will be better understood upon reading the description which will follow, given solely by way of example, and with reference being made to the accompanying drawings in which.

DETAILED DESCRIPTION

In the following, the terms "exterior" and "interior" are to be understood generally in a radial manner relative to a longitudinal direction X-X' of the pipe. The term "exterior" is to be understood as being relatively further away radially from the longitudinal direction X-X' and the term "interior" is to be understood as being relatively closer radially to the longitudinal direction X-X' of the pipe.

Figure 1:
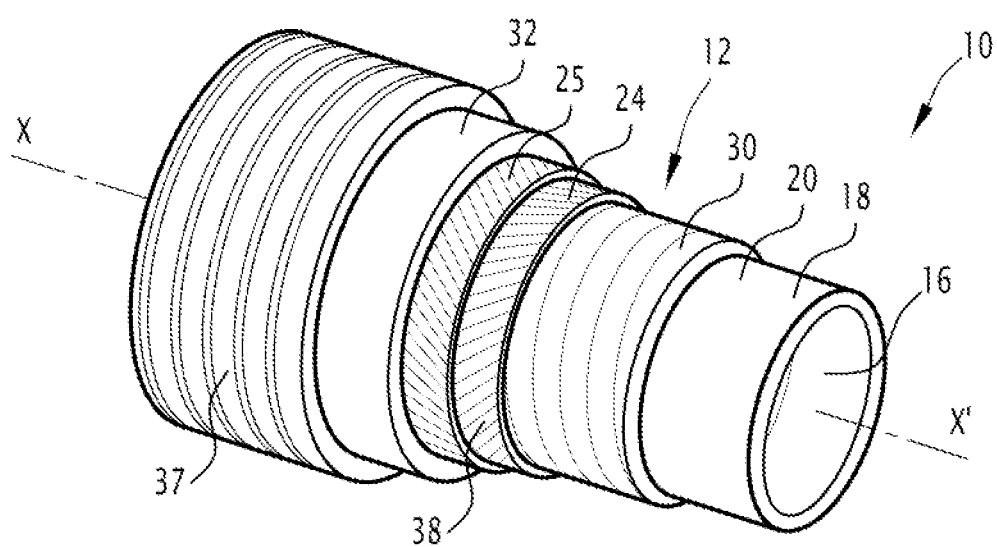
FIG. 1 is a partially stripped down perspective view of a section of a flexible pipe according to the invention.

A first flexible pipe 10 according to the invention is partially shown in FIG. 1.

The flexible pipe 10 comprises a central section 12 shown in part in FIG. 1.

With reference to FIG. 1, the flexible pipe 10 delimits a central passage 16 for circulation of fluid, advantageously a fluid for hydraulic fracturing. The central passage 16 extends along the longitudinal direction X-X', between the upstream end and the downstream end of the flexible pipe 10.

The flexible pipe 10 is for example intended to the circulation of a fluid under pressure for the hydraulic fracturing.

The flexible pipe is typically disposed onshore between a wellhead and a manifold.

The fluid is for example injected into a wellbore in case of hydraulic fracturing.

Hydraulic fracturing also referred to "fracking" is a method consisting in injecting a fracking fluid at high pressure, such as 1000 bar (15000 psi), into a reservoir through a wellbore to increase the permeability of the reservoir and release oil and gas.

The fracking fluid consists mainly in water. The fluid may comprise additional elements such as sand, and/or chemical components.

The temperature of the fluid is the surrounding temperature of the flexible pipe. It is generally comprised between −20° C. and 60° C.

In a variant, the flexible pipe 10 is intended to be disposed across a body of water (not shown) and in an installation for prospecting and exploitation of fluids, in particular hydrocarbons.

The body of water is, for example, a sea, a lake or an ocean. The depth of the body of water in the area of the fluid prospecting and exploitation installation is for example between 500 m and 3,000 m.

The fluid prospecting and exploitation installation includes a surface assembly in particular a floating assembly and a bottom assembly (not represented) which are generally connected to each other by a flexible pipe 10.

The flexible pipe 10 is preferably a pipe that is "not bonded" (referred to by the term "unbonded" as per the accepted English terminology).

At least two tensile armor layers of the flexible pipe 10 are free to move longitudinally in relation to each other upon the bending or flexion of the pipe. Advantageously, all of the layers of the flexible pipe 10 are free to move relative to the other. In a variant, the flexible pipe 10 is a bonded flexible pipe.

The flexible pipe 10 is in particular a smooth bore pipe as described below. A pipe is considered as "smooth bore pipe" when the innermost sheath of the pipe defining the passage for the fluid is made of a polymeric material. In such a case, the flexible pipe 10 does not comprise an inner metal carcass.

The flexible pipe 10 comprises a plurality of concentric layers around the longitudinal direction X-X', which extends continuously along the central section 12 between the upstream end and the downstream end of the flexible pipe 10, up to the end fittings 14 located at the ends of the flexible pipe 10.

According to the invention, the flexible pipe 10 comprises at least one internal sheath 18 made of a polymer based material and designed to be used for confining in a sealed manner the transported fluid in the central passage 16.

As it will be described below, in a first embodiment of the invention (FIGS. 1 and 2), the internal sheath 18 is formed by the pressure sheath 20.

In a second embodiment of the invention (FIG. 4), the internal sheath 18 is formed by a protective polymeric sheath 34 disposed internally to the pressure sheath 20.

Figure 2:
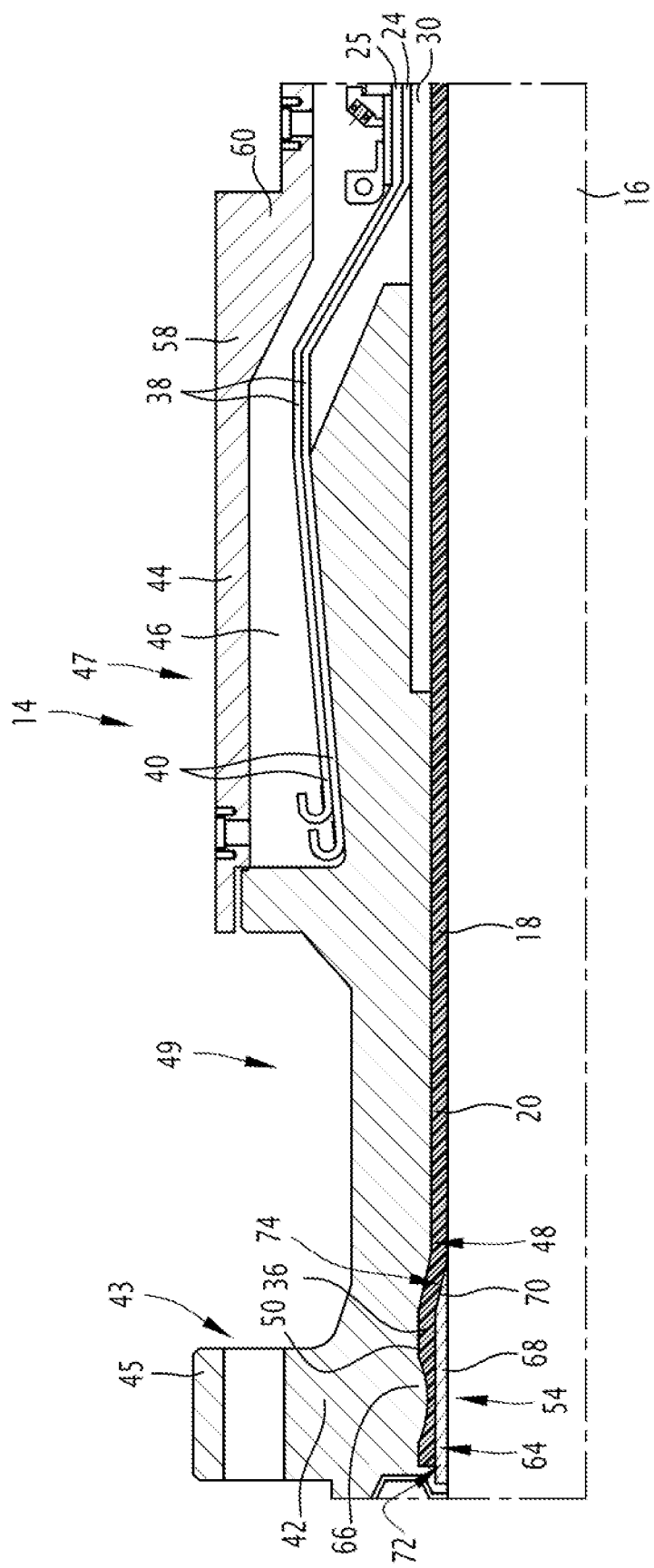
FIG. 2 is a schematic view, taken along a median cross section, of an end fitting according to a first embodiment of the invention.

Back to the first embodiment of the invention of FIGS. 1 and 2, the flexible pipe 10 further comprises at least one tensile armor layer 24, 25 disposed externally relative to the pressure sheath 20.

Advantageously, and according to the desired use, the flexible pipe 10 in addition comprises a pressure vault 30 interposed between the pressure sheath 20 and the layer or layers of tensile armor 24, 25 and an exterior sheath 32, designed to ensure the protection of the flexible pipe 10.

Preferably, the flexible pipe 10 further comprises a carcass 37 disposed externally to the exterior sheath 32.

In a known manner, the pressure sheath 20 is formed of polymer material, for example based on a polyolefin such as polyethylene, based on a polyamide such as PA11 or PA12, or based on fluorinated polymer such as polyvinylidene fluoride (PVDF).

In variant, the pressure sheath 20 is formed of an elastomer or a polyurethane.

The thickness of the pressure sheath 20 is for example comprised between 5 mm and 20 mm.

In the example of FIG. 1, the pressure vault 30 is designed to absorb the forces related to the pressure prevailing within the interior of the pressure sheath 20. It is for example formed of a metal profiled wire wound helically around the sheath 20. The profiled wire generally has a complex geometry, in particular having a form shaped like a Z, T, U, K, X, S or I.

The pressure vault 30 is helically wound with a short pitch around the pressure sheath 20, that is to say, with a helix angle having an absolute value close to 90°, typically comprised between 75° and 90°.

The flexible pipe 10 according to the invention comprises at least one armor layer 24, 25 formed of a helical winding of at least one elongated amour element (wires) 38.

In the example shown in FIG. 1, the flexible pipe 10 includes a plurality of reinforcing armor layers 24, 25, in particular an interior armor layer 24, applied on to the pressure vault 30 and an exterior reinforcing amour layer 25 around which is disposed the exterior sheath 32. The reinforcing armor layers 24, 25 allow withstanding the deformation created by the fluid under pressure circulating inside the flexible pipe.

Each armor layer 24, 25, includes longitudinal reinforcing armor elements 38 wound with a long pitch around the longitudinal direction X-X' of the pipe 10.

The term "wound with a long pitch", is used to indicate that the absolute value of the helix angle is less than 60°, and is typically comprised between 25° and 55°.

The reinforcing armor elements 38 of a first armor layer 24 are generally wound at an angle in the opposite direction relative to the armor element 38 of a second armor layer 25. Thus, if the winding angle of the reinforcing armor element 38 of the first armor layer 24 is equal to +α, α being comprised between 10° and 60, in particular between 25° and 55°, the winding angle of the reinforcing armor element 38 of the second amour layer 25 disposed in contact with the first armor layer 24 is for example −α, with α comprised between 10° and 60', in particular between 25° and 55°.

Advantageously, and according to the desired use, each layer of reinforcing armor 24, 25 is provided with at least one anti-wear layer (not shown) on which the layer 24, 25 is supported. The anti-wear strip (not shown) is for example made of plastic.

The reinforcing armor elements 38 are for example made of metallic wire, notably steel wires, or by ribbon in composite material, for example ribbon reinforced by carbon fibers.

The reinforcing armor elements 38 comprise end sections 40 inserted in the end fitting 14. Each end section 40 comprises a free end arranged in the end fitting 14.

The exterior sheath 32 is intended to prevent the permeation of fluid from the exterior of the flexible pipe 10 to the interior. It is advantageously made of a polymer material, in particular based on a polyolefin, such as polyethylene or polypropylene, based on a polyamide, such as the PA11 or PA12, or based on a fluorinated polymer such as polyvinylidene fluoride (PVDF).

The thickness of the exterior sheath 32 is for example comprised between 5 mm and 15 mm.

The carcass 37, when it is present, is formed for example of a profiled metal strip that is wound in a spiral. The spiral windings of the strip are advantageously interlocked into each other. The function of the carcass is to protect the exterior sheath 32 from tear, wear, abrasion and others external damages.

The helical winding of the profiled metal sheet forming the carcass 37 is short pitched, that is to say it has a helix angle having an absolute value close to 90°, typically comprised between 75° and 90°, more particularly between 75° and 88°.

As shown for example in FIG. 2, in addition to the front region 36 of the internal sheath 18, the end sections 40 of the armor layers 24, 25, the end fitting 14 comprises an end vault 42 and an outer cover 44 around the end vault 42. The outer cover 44 axially protrudes rearwards from the end vault 42. The outer cover 44 delimits with the end vault 42 and the pressure vault 30, a reception chamber 46 receiving the end sections 40 of the armors layers 24, 25.

The end vault 42 defines an internal surface 48 in contact with the front region 36 of the internal sheath 18.

The internal surface 48 comprises a front longitudinal part 50 extending along the X-X' direction.

The end fitting 14 further comprises a front sealing assembly 54 arranged around the front region 36 of the internal sheath 18. In the embodiment of FIG. 1, the front sealing assembly 54 is arranged around the pressure sheath 20. The end fitting 14 further comprises a rear sealing assembly (not represented) arranged around the exterior sheath 32.

The end vault 42 comprises a front region 43 comprising an end flange 45, a back region 47, covered by the outer cover 44, and an intermediate region 49 connecting the front region 43 to the back region 47.

In this example, the end vault 42 is intended to connect the flexible pipe 10 to another end fitting 14 or to a terminal equipment, advantageously by the end flange 45.

The outer cover 44 comprises a tubular peripheral wall 58 extending around the longitudinal direction X-X'. The peripheral wall 58 has a rear edge 60 extending axially rearwards beyond the end vault 42.

The outer cover 44 delimits the reception chamber 46 radially outwards. The end vault 42 and a front region 62 of the pressure sheath 20 delimit the reception chamber 46 radially inwards.

The reception chamber 46 is advantageously filed with a filling material intended to anchor the end sections 40 of the armor elements 38 inside the reception chamber 46.

The filling material is for example a thermosetting resin such as an epoxy resin or a thermoplastic resin.

The front sealing assembly 54 is arranged at the front of the end fitting 14. It is longitudinally spaced apart from the reception chamber 46, at the front of the reception chamber 46, in the front region 43.

The front sealing assembly 54 comprises a cannula 64 supporting at least one part of the front region 36 of the pressure sheath 20 and an annular protrusion 66 arranged on the internal surface 48 of the end vault 42 and protruding toward the central passage 16, and more particularly arranged on the front part 50 of the internal surface 48 of the end vault 42.

The front region 36 of the internal sheath 18 is circumferentially tightened between the protrusion 66 and the cannula 64.

Preferably, the protrusion 66 is integral with the end vault 42.

In variant, the protrusion 66 is an annular element fixed to the internal surface 48 of the end vault 42.

Preferably, the protrusion 66 protrudes beyond the internal surface 48 of the end vault 42 toward the central passage 16 to a distance comprised between 50 mm and 300 mm.

The front region 36 of the pressure sheath 20 is plastically deformed by the protrusion 66.

The cannula 64 has a general tubular shape. The cannula 64 comprises a cylindrical front portion 68 and a rear truncated cone shape portion 70 connected to the front portion 68.

The front portion 68 of the cannula 64 is arranged facing to the front part 50 of the internal surface 48 of the end vault 42.

An exterior surface 72 of the front portion 68 of the cannula 64 and the front part 50 of the internal surface 48 of the end vault 42 are substantially concentric.

The rear portion 70 of the cannula 66 allows a progressive radial spreading of the front region 36 of the pressure sheath 20 until the pressure sheath 20 covers the front portion 68 of the cannula 64.

The cannula 64 has a longitudinal length comprised between 100 mm and 400 mm.

The protrusion 66 is arranged facing to the front portion 68 of the cannula 64.

The cannula 64 is made in metal. For example, the cannula 64 is made of carbon or stainless steel.

In addition, the end fitting 14 may further comprise a longitudinal restraining element (not represented) for restraining the cannula 64 to the end vault 42.

The rear sealing assembly (not represented) comprises for example a rear crimping ring for crimping the external sheath, and a rear clamping flange of the rear crimping ring, fixed to the outer cover 44.

A method for mounting an end fitting 14 of the aforementioned type will now be described.

Initially, the method comprises providing a flexible pipe 10. A front region 36 of the internal sheath 18 is stripped from the pressure vault 30, the first and second armor layer 24, 25, the exterior sheath 32 and the carcass 37.

In the embodiment of FIG. 2, the end sections 40 of the armoring layers 24, 25 are then prepared to be received in the reception chamber 46. The end sections 40 are dismissed from the front region 36 of the pressure sheath 20 and the pressure vault 30.

Then, the method comprises providing an end vault 42 as described above and fixing said end vault 42 over the at least one part of the front region 36 of the pressure sheath 20.

The method comprises providing a cannula 64 as described above.

The cannula 64 is then inserted in the central passage 16 for supporting the part of the front region 36 of the pressure sheath 20.

For example, the cannula 64 is pushed by a tooling than can be supported by the end vault 42 which will act as reaction point.

The pressure sheath 20 is then circumferentially tightened between the protrusion 66 and the cannula 64.

When the cannula 64 is in place, the cannula 64 is not subject to any displacement thanks to the compressive forces applied by the rear portion 70 of the cannula 64 to the pressure sheath 20 during the mounting.

The outer cover 44 in then arranged and fixed on the end vault 42.

Finally, the rear sealing assembly is fixed and activated by clamping on the outer cover 44.

The reception chamber 46 is then filled with a filling material such as an epoxy resin or a thermoplastic resin.

Alternatively, the reception chamber 46 is filled with a filling material prior to the insertion of the cannula.

A method for replacing a pressure sheath 20 of a flexible pipe 10 as described above will be described.

The method applies when the pressure sheath 20 is damaged either chemically or mechanically.

First, the method comprises removing the cannula 64. This allows releasing the pressure sheath 20 from the end termination of the flexible pipe 10.

A first way for removing the cannula 64 consists in extracting the cannula 64 by mechanical means. For example, grooves or holes are made in the cannula 64 to allow the engagement of a mechanical or hydraulic extractor tool. Activation of the tool disengages the cannula 64 and extracts the cannula 64 from the end fitting 14.

In case the cannula 64 is extensively damaged, longitudinal cuts are performed on the entire length of the cannula 64 to split it in sectors, for example two, preferably three or more sectors. This allows releasing the compressive forces exerted by pressure sheath and provides a sufficient clearance to remove the cannula 64 by sectors.

The risk to damage the end fitting 14 is limited since the pressure sheath 20 protects the interior surface 48 of the end vault 42 from the tool.

Another way to extract the cannula 64 consists in setting a watertight packer in the cannula 64. The flexible pipe 10 is then filled with water and pressurized to push the cannula 64 out.

The method then comprises extracting the pressure sheath 20 from the flexible pipe from an end of the end fitting 14.

A first way to extract the pressure sheath 20 consists in inserting a thin cannula between an exterior surface of the pressure sheath 20 and the end fitting 14. This cannula acts as a support element for a tool expanding on it. The tool, such as a packer or a mechanical expander is then able to grip the pressure sheath 20.

Two tools are installed on both end of the flexible pipe 10 to exert tension on the pressure sheath 20 and decrease the diameter of the pressure sheath 20. Controlled tension winches can be used on both end of the flexible pipe for controlling the tension exerted on the pressure sheath 20. Alternatively, a come along is used on the pullout side and a braking system is used on the other side for short sections of pipe.

In a second variant, a tool comprising multiple cutting blades may be pulled through the flexible pipe 10 to segment the pressure sheath 20. Then, the pressure sheath 20 may be easily released segment by segment.

The method for replacing the pressure sheath 20 then comprises inserting a new pressure sheath 20.

A first way for inserting the new pressure sheath 20 consists in collapsing the pressure sheath 20 in a U shape to create an artificial smaller diameter. The collapsed pressure sheath 20 is inserted along the entire length of the flexible pipe 10. Then, mechanical reshaping for example using a pig allows giving the pressure sheath 20 its original tubular shape.

In variant, hydraulic reshaping is used. The pressure sheath 20 is filled with a pressurized liquid to give its original tubular shape.

Figure 3:
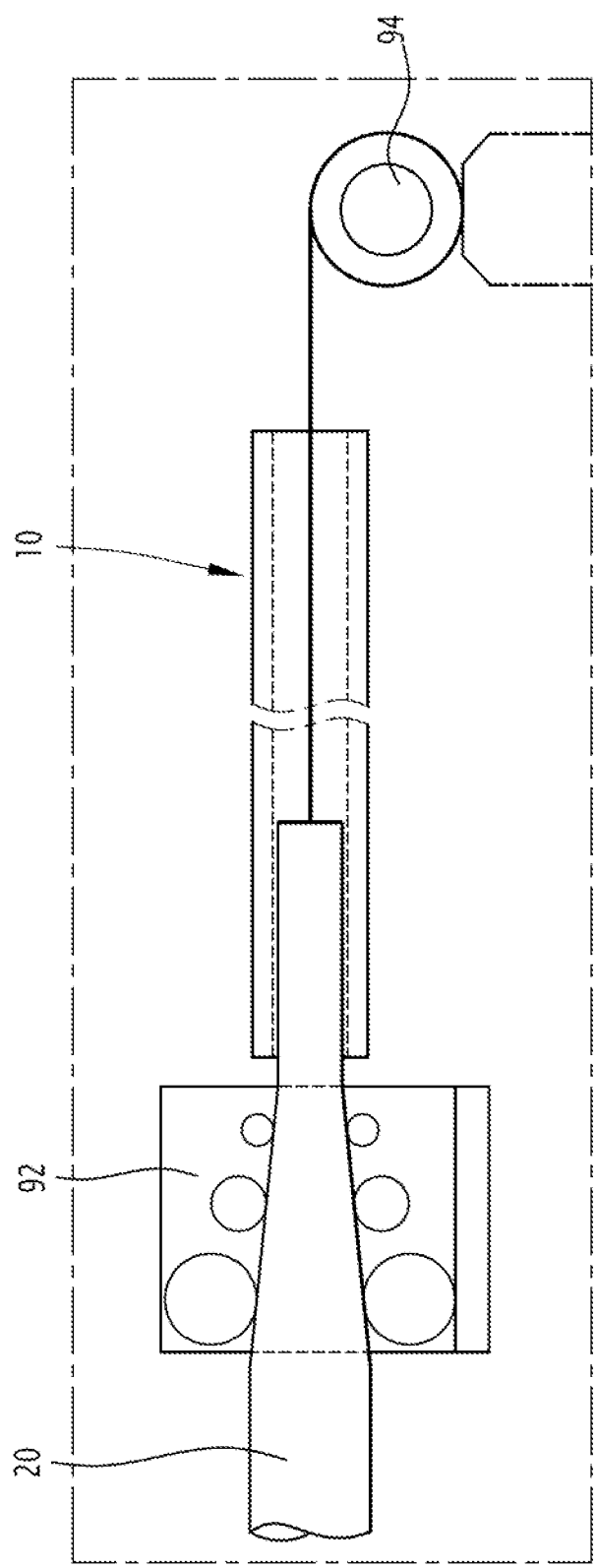
FIG. 3 is a schematic view of a step of a method for replacing a protective polymeric sheath according to the invention.

An alternative way for inserting the new pressure sheath 20 is shown in FIG. 3. The pressure sheath 20 is elongated using a die or a roller box 92 at one end of the flexible pipe 10 corresponding to the insertion point. A pulling force is applied to one end of the pressure sheath 20. For example, a winch 94 is attached to the end of the pressure sheath 20. By applying a tensile force on the pressure sheath 20, the pressure sheath 20 elongates and reduces in diameter. The die or the roller box 92 acts as a breaking force working against the winch 94.

Once the pressure sheath 20 is placed inside the flexible pipe 10, the tension is released and the pressure sheath 20 springs back to its original diameter.

In variant, a lubricant is applied on the pressure sheath 20 may be used for helping the insertion of the pressure sheath 20 in the flexible pipe 10.

In variant, a pig is used to pull the pressure sheath 20 inside the flexible pipe.

Another alternative way to for inserting the new pressure sheath 20 comprises inserting a pressure sheath 20 having a smaller diameter compared to the interior diameter of the pressure vault 30. Then, hydraulic expansion of the pressure sheath 20 is performed using hydrostatic pressure. In addition, heating the pressure sheath 20 may facilitate the radial expansion of the sheath 20.

The end fitting 14 according to the invention is particularly advantageous because by performing the crimping operation from the front end of the end fitting 14 with a protrusion 66 defined in the end vault 42, allows reducing the number of elements in the end fitting 14, reducing the size and the weight of the end fitting 14.

Figure 4:
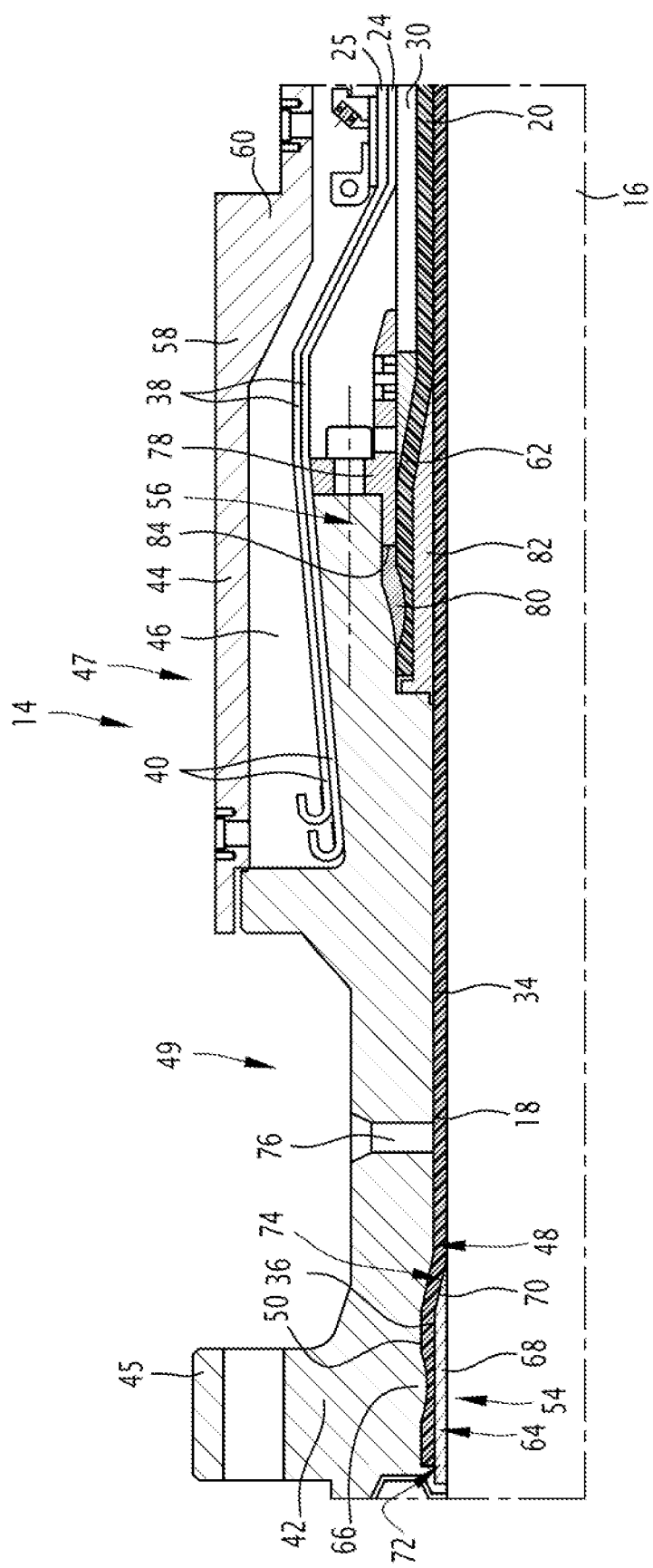
FIG. 4 is a schematic view, taken along a median cross section, of an end fitting according to a second embodiment of the invention.

A second embodiment of an end fitting 14 according to the invention is shown in FIG. 4. The description of this embodiment is made by difference compared to the first embodiment.

In this embodiment, the flexible pipe 10 comprises both a protective polymeric sheath 34 and a pressure sheath 20 disposed externally to the protective polymeric sheath 34.

The protective polymeric sheath 34 is arranged in an inner surface of the pressure sheath 20.

The protective polymeric sheath 34 protects the pressure sheath 20 from the fluid circulating in the central passage 16. The protective polymeric sheath 34 is particularly advantageous to protect the inner surface of the pressure sheath 20 in case the fluid circulating in the central passage 16 comprises elements such as sand grain which may damage the inner surface of the pressure sheath 20.

The protective polymeric sheath 34 is formed for example by a polymeric material for example based on a polyolefin such as a polyethylene or based on a polyamide such as a PA11 or a PA12 or based on a fluorinated polymer such as polyvinylidene fluoride (PVDF). In variant, the protective polymeric sheath 34 is formed by an elastomer based materials or a polyurethane.

The thickness of the protective polymeric sheath 34 is for example comprised between 5 mm and 30 mm.

The protective polymeric sheath 34 comprises a front region 36 inserted in the end fitting 14.

The protective polymeric sheath 34 may either co-extruded with the pressure sheath or fabricated separately.

In this embodiment, the internal polymeric sheath 18 is formed by the protective polymeric sheath 34.

Therefore, as visible in FIG. 4, the front sealing assembly 54 is arranged around the protective polymeric sheath 34.

The end fitting further comprises an intermediate sealing assembly 56 around the pressure sheath 20.

The intermediate sealing assembly 56 comprises an intermediate crimping flange 78, an intermediate crimping ring 80 and an intermediate supporting cannula 82 interposed between the protective polymeric sheath 34 and the pressure sheath 20.

The intermediate crimping ring 80 is interposed between a rear surface 84 of the intermediate crimping flange 78 and the pressure sheath 20.

The pressure sheath 20 relies on the intermediate supporting cannula 82.

Preferably, as illustrated in FIG. 4, the end fitting 14 comprises a test port 76 defined in the end vault 42 and arranged between the protrusion 66 and the intermediate sealing assembly 56. The test port 76 allows testing the crimping effectiveness and thus the tightness of the end fitting 14. Here the test port 76 is located in the intermediate region 49.

In this embodiment, the test port 76 allows controlling the integrity of the flexible pipe 10. Indeed, for example, it allows measuring the pressure between the pressure sheath and the protective polymeric sheath 34. When the protective polymeric sheath 34 is damaged, the pressure in the test port 76 increases indicating that the protective polymeric sheath has to be changed.

The method for mounting an end fitting 14 according to the second embodiment further comprises fixing the intermediate sealing assembly 56 and activating it by clamping onto the end vault 42.

The various ways for removing the protective polymeric sheath 34 or for inserting a new protective polymeric sheath 34 are similar to those described above for the pressure sheath 20 in the first embodiment.

In addition, a second way for extracting the protective polymeric sheath 34 is to deform the protective polymeric sheath 34 into a collapsed U shape. This may be done by pressurizing the annular space defined between the pressure sheath 20 and the protective polymeric sheath 34 to collapse the protective polymeric sheath 34.

Figure 5:
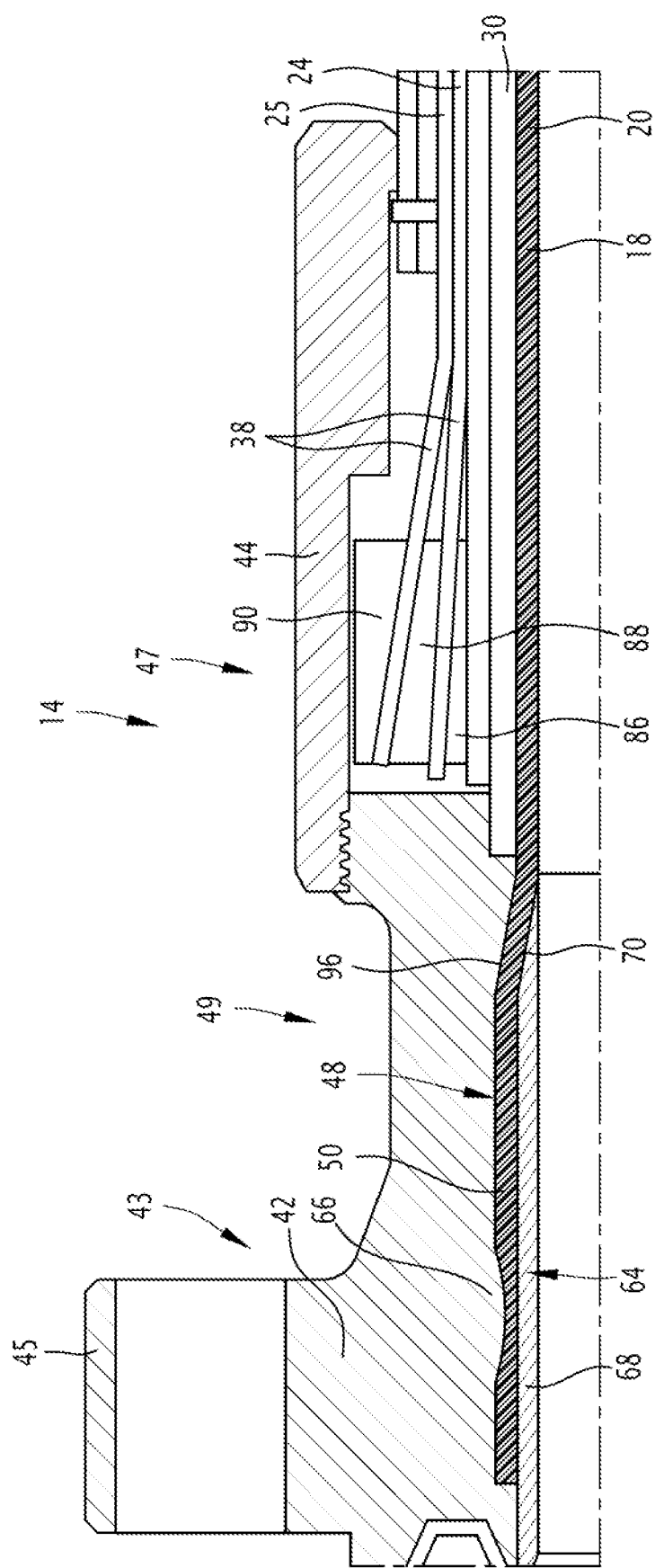
FIG. 5 is a schematic view, taken along a median cross section, of an end fitting according to third embodiment of the invention.

A third embodiment of an end fitting 14 according to the invention is shown in FIG. 5. The description of this embodiment is made by difference compared to the first embodiment.

In this embodiment, inside the reception chamber 46, the end fitting 14 further comprises an interior ring 86 on which the end sections 40 of the first armor layer 24 exteriorly bear on, an intermediate ring 88 interposed between the end sections 40 of the first armor layer 24 and the end sections 40 of the second armor layer 25, and an exterior ring 90 disposed in external support on the end sections 40 of the second armor layer 25.

The internal surface 48 of the end vault 42 comprises a front longitudinal part 50 connected to a rear part 96. The rear part 96 extends along a direction intersecting the longitudinal direction X-X'.

The rear portion 70 of the cannula 64 is arranged facing to the rear part 96 of the internal surface 48 of the end vault 42.

An exterior surface 72 of the front portion 68 of the cannula 64 and the front part 50 of the internal surface 48 of the end vault 42 are substantially concentric.

An exterior surface 74 of the rear portion 70 of the cannula 64 and the rear part 96 of the internal surface 48 of the end vault 42 are substantially concentric.

Figure 6:
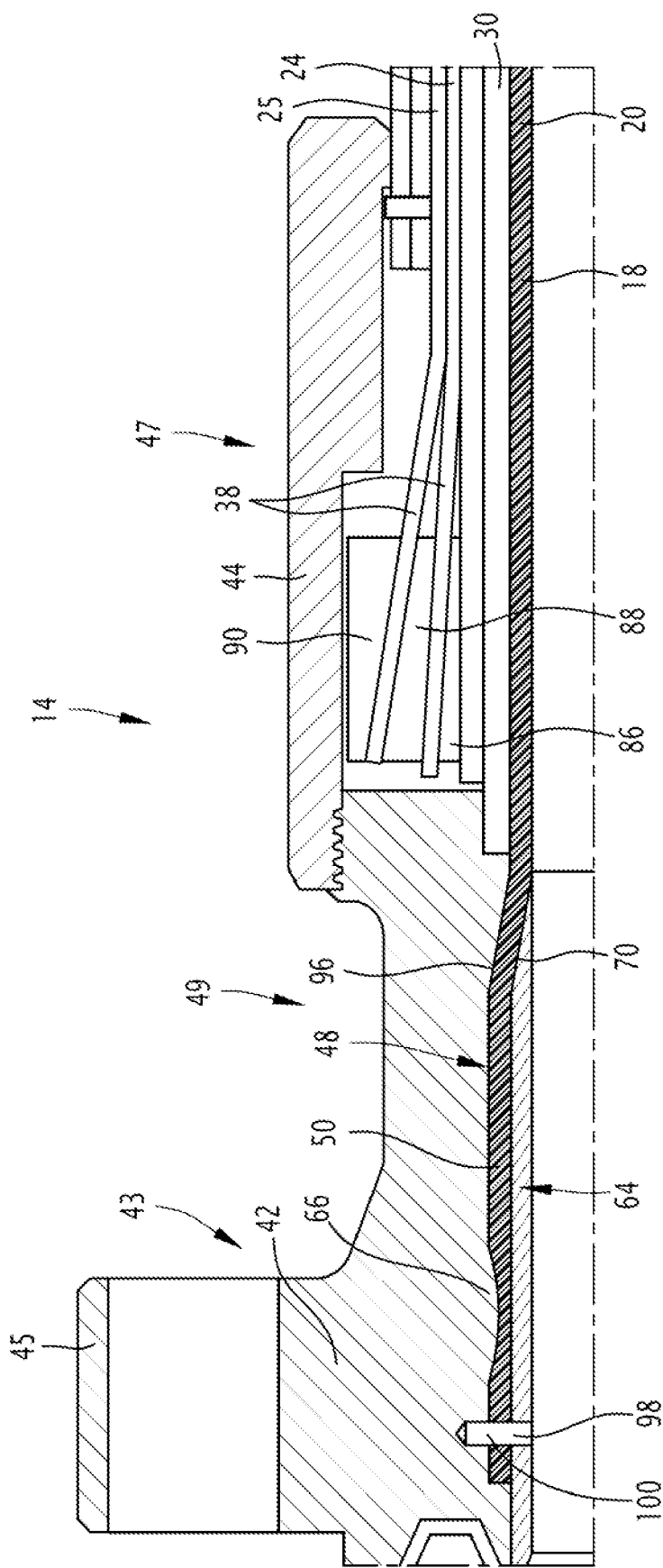
FIG. 6 is a schematic view, taken along a median cross section, of an end fitting according to a fourth embodiment of the invention.

A fourth embodiment of the invention is shown in FIG. 6. This embodiment is described by differences compared to the embodiment of FIG. 5.

The end fitting 14 further comprises a longitudinal restraining element 98 for restraining the cannula 64 to the end vault 42. The restraining element 98 is for example a pin 100 inserted through the cannula 64 into the end vault 42 as shown in FIG. 6.

In variant, the restraining element 98 comprises a ring set in the end vault 42 or a protrusion part of the cannula 64 protruding towards the end vault 42 inserted in a circular groove defined in the end vault 42.

Such a restraining element 98 may also be used in the embodiment of FIG. 2.

Figure 7:
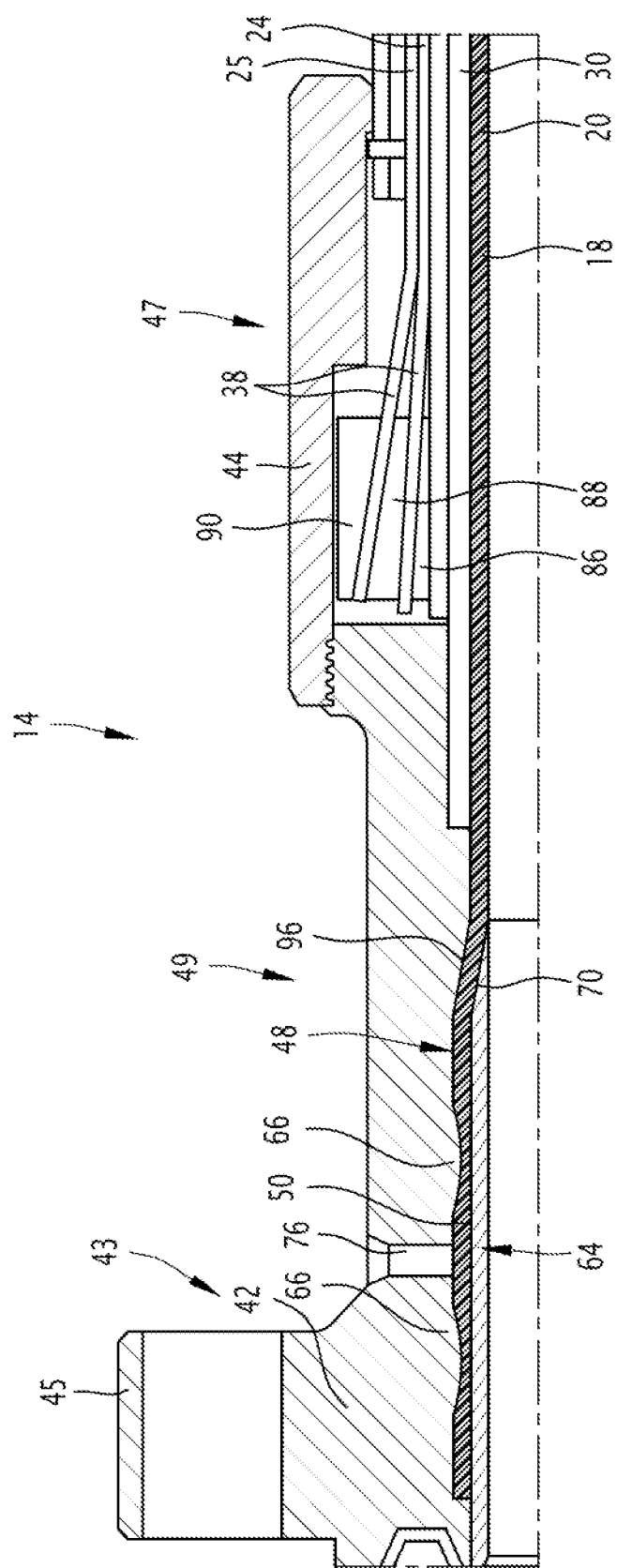
FIG. 7 is a schematic view, taken along a median cross section, of an end fitting according to a fifth embodiment of the invention.

A fifth embodiment of the invention is shown in FIG. 7. This embodiment is described by differences to the embodiment of FIG. 5.

The front sealing assembly 54 comprises two annular protrusions 66 arranged along the longitudinal direction X-X'. Preferably, the two protrusions 66 have the same geometrical features.

One of the protrusions 66 radially extends in the intermediate region 49 of the end vault 42.

In addition, the front sealing assembly 54 may comprise a test port 76 defined in the end vault 42 arranged between the two protrusions 66. The test port allows controlling the sealing of an inner space delimited by the internal surface 48 of the end vault 42 and an external surface of the internal sheath 18, between the annular protrusions 66.

The invention claimed is:

1. An end fitting of a flexible pipe for conveying a fluid comprising:
    an end vault and an outer cover fixed around the end vault and delimiting a reception chamber,
    at least a front region of an internal polymeric sheath defining a central passage for conveying the fluid, the central passage extending according to a longitudinal direction,
    at least end sections of at least one tensile armor layer arranged around the internal polymeric sheath, the end sections being arranged in the reception chamber,
    a front sealing assembly arranged around the front region of the internal polymeric sheath,
    wherein the front sealing assembly comprises a cannula supporting at least one part of the front region of the internal polymeric sheath and at least one annular protrusion arranged on an internal surface of the end vault protruding toward the central passage, the at least one part of the front region of the internal polymeric sheath being circumferentially tightened between the at least one protrusion and the cannula,
    wherein the at least one protrusion is integral with the end vault and wherein the at least one protrusion is an annular ring.

2. The end fitting according to claim 1, wherein the at least one part of the front region of the internal polymeric sheath is plastically deformed by the protrusion.

3. The end fitting according to claim 1, wherein the front sealing assembly-comprises two annular protrusions set apart along the longitudinal direction.

4. The end fitting according to claim 3, further comprising a test port defined in the end vault for controlling the sealing of an inner space delimited by the internal surface of the end vault and an external surface of the internal polymeric sheath, between the annular protrusions.

5. The end fitting according to claim 1, wherein the front sealing assembly comprises a restraining element for maintaining the cannula fixed to the end vault.

6. The end fitting according to claim 1, wherein the internal polymeric sheath is a polymeric pressure sheath intended to tightly confine the fluid conveyed by the central passage.

7. The end fitting according to claim 6, wherein the polymeric pressure sheath has a thickness comprised between 5 mm and 20 mm.

8. The end fitting according to claim 1, further comprising a front region of a pressure sheath, the internal polymeric sheath being a protective polymeric sheath intended to protect the pressure sheath, the pressure sheath being arranged around the protective polymeric sheath.

9. The end fitting according to claim 8, further comprising an intermediate sealing assembly arranged around the front region of the pressure sheath.

10. A flexible pipe for conveying a fluid comprising:
    at least an internal polymeric sheath defining a central passage for conveying the fluid, the central passage extending according to a longitudinal direction,
    at least one tensile armor layer arranged around the internal polymeric sheath, and
    an end fitting according to claim 1.

11. The flexible pipe according to claim 10, comprising an end fitting according to claim 1 and a pressure sheath intended to tightly confine the fluid conveyed by the central passage, the internal polymeric sheath being formed by the pressure sheath.

12. The flexible pipe according to claim 10, further comprising a pressure sheath and a protective polymeric sheath intended to protect the pressure sheath and intended to tightly confine the fluid conveyed by the central passage, the pressure sheath being arranged around the protective polymeric sheath, the internal sheath-being formed by the protective polymeric sheath.

13. A method for replacing an internal sheath in a flexible pipe according to claim 12, the method comprising the following steps:
removing the cannula,
extracting the internal sheath from the flexible pipe from an end of the end fitting,
inserting a new internal sheath by the end of the end fitting,
inserting a new cannula into the internal sheath to circumferentially tighten the at least one part of the front region of the internal sheath being between the at least one protrusion of the front sealing assembly and the cannula.

14. A method for mounting an end fitting according to claim 1, the method comprising the following steps:
providing a flexible pipe,
providing an end vault comprising at least one annular protrusion arranged on the internal surface of the end vault, the at least one protrusion protruding toward the central passage, fixing the end fault over at least one part of the front region of the internal sheath,
providing a cannula,
inserting the cannula for supporting the at least one part of the front region of the internal sheath to circumferentially tightened said at least one part of the front region of the internal sheath between the at least one annular protrusion and the cannula.

15. The end fitting according to claim 1, wherein the cannula comprises a cylindrical front portion and a rear truncated cone shape portion connected to the front portion, the rear portion of the cannula allowing a progressive radial spreading of the front region of the internal polymeric sheath until the internal polymeric sheath covers the front portion of the cannula.

16. The end fitting according to claim 15, wherein the front portion of the cannula is arranged facing to a front part of the internal surface of the end vault, and wherein an exterior surface of the front portion of the cannula and the front part of the internal surface of the end vault are substantially concentric.

17. The end fitting according to claim 15, wherein an exterior surface of the front portion of the cannula is smooth.

18. The end fitting according to claim 1, wherein the cannula is configured to be inserted in a central passage of the end vault, by axially pushing the cannula.

* * * * *